W. KNUDSEN.
CONNECTING ROD BEARING.
APPLICATION FILED JULY 5, 1917.
1,259,874.
Patented Mar. 19, 1918.
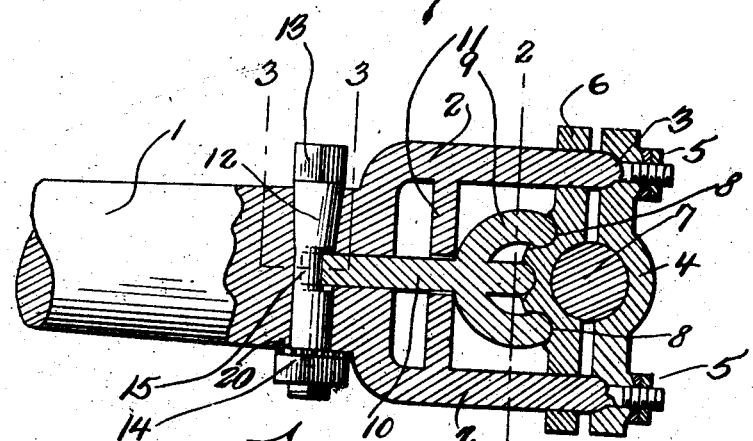
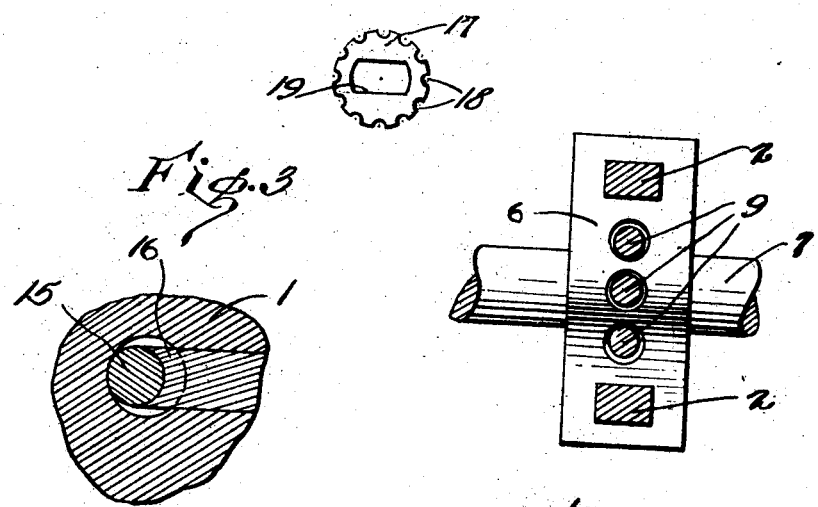
WITNESSES
Howard F. Costello
INVENTOR
WILLIAM KNUDSEN
BY
ATTORNEY

UNITED STATES PATENT OFFICE.

WILLIAM KNUDSEN, OF FREMONT, NEBRASKA.

CONNECTING-ROD BEARING.

1,259,874.  Specification of Letters Patent.  Patented Mar. 19, 1918.

Application filed July 5, 1917. Serial No. 178,872.

*To all whom it may concern:*

Be it known that I, WILLIAM KNUDSEN, a citizen of the United States, residing at Fremont, in the county of Dodge and State of Nebraska, have invented certain new and useful Improvements in Connecting-Rod Bearings, of which the following is a specification.

This invention relates to an improved construction in connecting rod bearings, and more particularly, to a construction whereby wear upon the bearings, may be taken up.

A primary object of the invention, is to provide a novel construction in which there are provided means whereby the bearings may be readjusted, by simple and efficient means which allow the operator to make the necessary adjustments in the least possible time.

Also the improvements embody a novel construction and arrangement, whereby the adjustments may be made by an eccentric turning plug, which is so positioned that access may be readily had thereto.

Other improvements and novel details in the construction and arrangement of the various parts of the apparatus will be brought out more in detail in the description to follow, which, for a clear understanding of the invention, should be considered in connection with the accompanying drawings forming a part hereof, and wherein is disclosed for the purpose of illustration, convenient and satisfactory embodiments of the invention.

In the drawings:—

Figure 1 is a longitudinal section of the connecting rod bearing together with the improved adjusting construction, Fig. 2 is a transverse section taken on line 2—2 of Fig. 1, Fig. 3 is a fragmentary view in section, of the eccentric adjusting means, and Fig. 4 is a plan view of a lock washer used in connection with the eccentric adjusting means.

Referring now more particularly to the drawings, wherein like reference characters designate corresponding parts throughout the several views thereof, 1 is a connecting rod having extensions 2, which are provided with reduced end portions 3. 4 is a bearing pivotally mounted upon the reduced end portions 3 and held in position by nuts 5. 6 is a second bearing slidably mounted upon the extensions 2 and 7 is a shaft supported by the bearings 4 and 6. Arranged in the outer face of the bearing 6 are a plurality of recesses 8, adapted to receive fingers 9 formed upon a connecting member 10, which is supported by bearing webs 11 formed upon the extensions 2, and extends through an opening arranged in the connecting rod to a position whereby the same may be acted upon by the adjusting member. 12 is a turning plug or bolt arranged in suitable bearings within the connecting rod 1 and having a squared end portion 13, adapted to receive a wrench of other operating means, the bolt being held against lateral movement by a securing nut 14. Arranged intermediate of the ends on the turning bolt is an eccentric portion 15, which is adapted to engage with a concaved portion 16 formed upon the connecting member 10.

The operation of the device is as follows: Assuming that the bearing 6 is to be adjusted so as to take up the wear, a wrench or other means is applied to the squared portion 13 of the turning bolt 12, whereupon the same is turned so as to operate the eccentric portion 15 of the turning bolt, in such a manner as to force the connecting rod 10 forward. By this action, it will be obvious that the movement will be transmitted through the fingers 9 formed upon the connecting members 10 and will force the movable bearing parts 6 to be adjusted so as to compensate for the wear thereupon. In providing the connecting member 10 with a plurality of fingers 9, it will be seen that the bearing will be evenly adjusted, and will be held firmly in its adjusted position.

It will be noted that the locking washer 17 is provided with notches 18 in its periphery, while the washer is also provided with a rectangular opening 19 at its center. As a result this washer may be positioned upon the end of the bolt 12 until the washer abuts against the connecting rod 1. A pin 20 is carried by the connecting rod and projects outwardly therefrom. As a result this pin will fit within one of the notches 18 for holding the washer 17 against rotation and as the bolt 12 will fit within the rectangular opening 19, it is obvious the locking washer will hold the bolt against rotation after the same has been turned for adjusting the connecting member 10. The nut 14 being positioned upon the projecting threaded end of the bolt 12 will of course hold the washer in position and in this way the bolt is held against accidental movement until after the washer and nut have been removed from engagement therewith.

It is to be noted that I have referred to this construction, as being adapted for connecting rods, but I wish it to be understood that the device may be applied to any bearing construction, wherein such adjustments are necessary.

While I have herein disclosed a specific embodiment of the invention it will be apparent to persons skilled in the art that the invention is capable of embodiment in other forms and devices differing in detail and arrangement from that shown, as may be in keeping with the hereto appended claims.

Having thus described the invention, what I claim is:—

1. In a bearing adjuster, including a fixed bearing, a movable bearing, a connecting member provided at one end with a plurality of fingers adapted to engage the movable bearing, and eccentric means for adjusting the same.

2. In a bearing adjuster, including a fixed bearing, a movable bearing, a bifurcated connecting member engaging the movable bearing, and an eccentric turning plug adapted to operate the connecting member.

3. In a bearing adjuster, including a fixed bearing, a movable bearing, a connecting member provided with a plurality of fingers adapted to engage the movable bearing, and an eccentric turning part for operating the connecting member.

4. In a bearing adjuster, including a fixed bearing, a movable bearing, said movable bearing having recesses in one face, a connecting member provided with a plurality of fingers adapted to be received by the said recesses, and an eccentric turning plug arranged to coöperate with the connecting member.

5. In a bearing adjuster, the combination of a connecting rod having parallel extensions projecting therefrom, a fixed bearing carried upon said extensions, a movable bearing slidably mounted upon said extensions, a connecting member carried by said connecting rod, said connecting member having a plurality of fingers engaging said movable or sliding bearing, and means for urging said connecting member in one direction for adjusting said slidable bearing.

6. In a bearing adjuster, the combination of a connecting rod having parallel extensions projecting therefrom, a fixed bearing carried upon said extensions a slidable bearing mounted upon said extensions, a bifurcated connecting member engaging said slidable bearing and means for urging said connecting member in one direction for urging said slidable bearing toward said fixed bearing.

7. In a bearing adjuster, the combination of a connecting rod having parallel extensions projecting therefrom, a fixed bearing carried upon said extensions, a slidable bearing mounted upon said extensions, a connecting member provided with a plurality of fingers engaging said slidable bearing, and an eccentric turning part for moving the connecting member.

8. In a bearing adjuster, the combination of a connecting rod having parallel extensions projecting therefrom, a fixed bearing carried upon said extensions, a slidable bearing movably mounted upon said extensions in alinement with said fixed bearing, said movable or sliding bearing having recesses in one face thereof, a connecting member provided with a plurality of fingers projecting into said recesses, and an eccentric turning bolt arranged to coöperate with the connecting member for urging the same in one direction, thus causing said fingers to move said slidable bearing toward said fixed bearing.

9. In a bearing adjuster, the combination of a connecting rod having parallel extensions projecting therefrom, a bearing web connecting said extensions together adjacent their inner ends, a fixed bearing carried upon said extensions, a slidable bearing mounted upon said extensions in alinement with said fixed bearing, a connecting member projecting through said web and engaging said slidable bearing, and an eccentric turning bolt engaging said connecting member for urging the same in one direction, thus causing said connecting member to urge said slidable member toward said fixed bearing.

10. In a bearing adjuster, the combination of a connecting rod having parallel extensions, a fixed bearing carried upon said extensions, a slidable bearing mounted upon said extensions, a bearing web connecting the said extensions adjacent their inner ends, said connecting rod having an opening formed therein, a connecting member projecting through said web and into said opening, said slidable bearing having sockets formed therein, fingers formed upon said connecting member and projecting into said sockets, and an eccentric turnable bolt carried by said connecting rod and bearing upon said connecting member, thus causing said connecting member to be moved as the bolt is turned for causing said fingers to urge said slidable bearing toward said fixed bearing.

11. In a bearing adjuster, the combination of a connecting rod having parallel extensions projecting therefrom, a fixed bearing carried upon said extension, a movable bearing slidably mounted upon said extensions, a connecting member carried by said connecting rod, said connecting member engaging said slidable bearing at a plurality of points whereby said slidable bearing may be easily urged in one direction by said connecting member, and means for urging said connecting member in one direction.

In testimony whereof I affix my signature in presence of two witnesses.

WILLIAM KNUDSEN.

Witnesses:
OTTO H. SCHURMAN,
GEO. C. GAGE.

Copies of this patent may be obtained for five cents each, by addressing the "Commissioner of Patents, Washington, D. C."